US 7,512,086 B2

(12) United States Patent
Choi et al.

(10) Patent No.: US 7,512,086 B2
(45) Date of Patent: Mar. 31, 2009

(54) METHOD OF ASSIGNING AN UPLINK RANDOM ACCESS CHANNEL IN A CDMA MOBILE COMMUNICATION SYSTEM

(75) Inventors: Sung-Ho Choi, Songnam-shi (KR); Kook-Heui Lee, Songnam-shi (KR); Hyun-Woo Lee, Suwon-shi (KR); Seong-Ill Park, Gunpo-shi (KR); Sung-Oh Hwang, Yongin-shi (KR); Jae-Yoel Kim, Kunpo-shi (KR); Byung-Jae Kwak, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 1188 days.

(21) Appl. No.: 09/879,651

(22) Filed: Jun. 12, 2001

(65) Prior Publication Data

US 2007/0274278 A1 Nov. 29, 2007

(30) Foreign Application Priority Data

| Jun. 12, 2000 | (KR) | ............................. 2000-33108 |
| Jun. 22, 2000 | (KR) | ............................. 2000-34612 |
| Sep. 21, 2000 | (KR) | ............................. 2000-56311 |

(51) Int. Cl.
*H04Q 7/20* (2006.01)

(52) U.S. Cl. ........................ 370/328; 370/335; 370/341; 370/342; 455/522

(58) Field of Classification Search ................. 370/328, 370/320, 445, 200, 335, 375, 350, 145, 209, 370/149, 441, 342
See application file for complete search history.

(56) References Cited

U.S. PATENT DOCUMENTS 6,532,225 B1 * 3/2003 Chang et al. ................. 370/341
6,643,275 B1 * 11/2003 Gustafsson et al. .......... 370/328
6,717,930 B1 * 4/2004 Sezgin et al. ................ 370/335
6,724,742 B1 * 4/2004 Mun et al. ................... 370/335
6,754,506 B2 * 6/2004 Chang et al. ................. 455/522
7,089,028 B1 * 8/2006 Baker et al. ................. 455/522
2001/0055293 A1 * 12/2001 Parsa et al. .................. 370/342
2002/0041578 A1 * 4/2002 Kim et al. .................... 370/335
2003/0119452 A1 * 6/2003 Kim et al. ...................... 455/69

OTHER PUBLICATIONS

China Wireless Telecommunication Standard (CWTS) TS C105, "Physical Layer Procedures", V2.1.0, Oct. 1999, All Pages.*

(Continued)

*Primary Examiner*—Charles N Appiah
*Assistant Examiner*—Randy Peaches
(74) *Attorney, Agent, or Firm*—The Farrell Law Firm, PC

(57) ABSTRACT

Disclosed is an uplink random access procedure in an NB-TDD (Narrow Band Time Division Duplexing) system. To achieve an acknowledgement for data transmission from a UTRAN (UMTS Terrestrial Radio Access Network), a UE selects one of a plurality of sync codes by which the UTRAN identifies UEs that request data transmission and transmits the selected sync code in a time slot of a sub-frame to the UTRAN. Then, the UE receives the sync code information, information about the arrival time of the sync code, time update information indicating a variation in the transmission time of data, and power information indicating an adjustment to a power gain in the UE from the UTRAN on an FPACH (Fast Physical Access Channel). The UE transmits the data on a P-RACH (Physical Random Access Channel) mapped from the FPACH according to the time update information and the power information.

17 Claims, 12 Drawing Sheets

OTHER PUBLICATIONS

China Wireless Telecommunication Standard (CWTS) TS C102, "Physical Channels and mapping of transport channels onto physical channels", V2.1.0, Oct. 1999, All Pages.*

China Wireless Telecommunication Standard (CWTS) TS C102, "Physical Channels and mapping of transport channels onto physical channels", V3.3.0, Sep. 2000, All Pages.*

* cited by examiner

METHOD OF ASSIGNING AN UPLINK RANDOM ACCESS CHANNEL IN A CDMA MOBILE COMMUNICATION SYSTEM

PRIORITY

This application claims priority to an application entitled "Random Access Procedure in NB-TDD CDMA Communication System" filed in the Korean Industrial Property Office on Jun. 12, 2000 and assigned Serial No. 2000-33108, an application entitled "Uplink Access Method in NB-TDD CDMA Communication System" filed in the Korean Industrial Property Office on Jun. 22, 2000 and assigned Serial No. 2000-34612, and an application entitled "Method of Assigning Uplink Random Access Channel in CDMA Mobile Communication system" filed in the Korean Industrial Property Office on Sep. 21, 2000 and assigned Serial No. 2000-56311, the contents of each of which are hereby incorporated by reference.

BACKGROUND OF THE INVENTION

1. Field of the Invention

The present invention relates generally to a channel assignment method in a CDMA (Code Division Multiple Access) mobile communication system, and in particular, to a method of assigning a P-RACH (Physical Random Access Channel) for data transmission on an RACH (Random Access Channel).

2. Description of the Related Art

The demand for a mobile communication system supporting the transmission of data and pictures as well as a typical voice service is growing along with the rapid development of mobile communication technology. This type of mobile communication system is known as the future mobile communication system. The future mobile communication system is generally implemented in CDMA. CDMA systems are divided into synchronous ones and asynchronous ones. The U.S. employs a synchronous CDMA system whereas Europe and Japan employ an asynchronous CDMA system. Therefore, different standardization tasks are in work in the U.S. and Europe. The European future mobile communication system is known as UMTS (Universal Mobile Telecommunication System).

The production of globally applicable technical specifications is being undertaken with 3GPP ($3^{rd}$ Generation Partnership Project) for the UMTS system and an NB-TDD (Narrow Band Time Division Duplexing) system where base stations are synchronized to one another. The 3GPP organization has submitted technical reports about the NB-TDD system. The contents of the technical reports are incorporated herein by reference and include a random access procedure as summarized below.

In the NB-TDD CDMA communication system, the random access procedure is performed in three stages: synchronization to a UTRAN (UMTS Terrestrial Radio Access Network) by a time division frame and acquisition of UTRAN information, acquisition of a P-RACH, and transmission of RACH data on the P-RACH.

Before a description of the random access procedure, the structure of a (radio) frame is described. The (radio) frame is 10 ms in duration and includes two sub-frames. Each sub-frame is composed of seven normal time slots, downlink pilot time slot (DwPTS), and uplink pilot time slot (UpPTS).

(1) Synchronization to UTRAN and acquisition of UTRAN information: A UE (User Equipment) synchronizes its timing to the UTRAN using a 64-bit SYNC code received in a downlink pilot time slot. There are 32 SYNC codes and each UTRAN is assigned to one SYNC code. The UE identifies a SYNC code assigned to a specific UTRAN using a matched filter. After the identification, the UE can be synchronized to the base station. If the UE succeeds in synchronization, it can obtain information about a P-RACH and an F-PACH (Fast Physical Access Channel) for use in the random access procedure based on UTRAN information, which is broadcast periodically from the UTRAN. The P-RACH and FPACH information includes codes assigned to the P-RACH and the FPACH, a spreading factor (SF), midambles, and time slots. The UE determines the one-to-one matching relationship between the FPACH and the P-RACH from the UTRAN information.

(2) Acquisition of P-RACH: Each SYNC code is assigned eight SYNC1 codes. The UE selects one of the eight SYNC1 codes assigned to the SYNC code identified in stage 1 and transmits the selected SYNC1 code in an uplink pilot time slot. The UTRAN detects the arrival time and power of the SYNC1 code, calculates time and power variations, and transmits the variations to the UE within four or less sub-frames on a corresponding FPACH. The corresponding FPACH refers to an FPACH assigned to the selected SYNC1 code. The relationship between the SYNC1 code and the FPACH is also included in the UTRAN information of stage 1. The FPACH includes information about the type of the SYNC1 code and a sub-frame in which the SYNC1 code was received. After transmitting the SYNC1 code, the UE monitors FPACHs in the four sub-frames and if it receives an FPACH for the UE, determines that the UTRAN has acknowledged the SYNC1 code sent by the UE. Then, the UE is authorized to use a P-RACH corresponding to the FPACH.

(3) Transmission of RACH data: The UE is assigned to the P-RACH two sub-frames after the FPACH. The UE transmits RACH data on the P-RACH.

In the above random access procedure, SYNC1 codes correspond one to one to FPACHs and P-RACHs. Therefore, if less than eight FPACHs or P-RACHs are defined in one sub-frame, less than eight SYNC1 codes may be used. This implies that less SYNC1 codes are available to UEs and as a result, channel collision is likely to increase. One sub-frame is a unit time set in the NB-TDD CDMA communication system, 5 ms. If more SYNC1 codes than FPACHs or P-RACHs per sub-frame are used, P-RACH resources are dissipated and a connection time delay is prolonged due to the one-to-one matching relationship between SYNC1 codes and FPACHs/P-RACHs.

SUMMARY OF THE INVENTION

It is, therefore, an object of the present invention to provide a method of efficiently using channels in random access in an NB-TDD CDMA communication system.

It is also object of the present invention to provide a method of minimizing the time required for acquiring a P-RACH in an NB-TDD CDMA communication system.

It is another object of the present invention to provide a method of minimizing for RACHs in an NB-TDD CDMA communication system.

It is a further object of the present invention to provide a method of assigning an FPACH and a P-RACH without mapping a sync code to the FPACH and P-RACH in a random access procedure in a UTRAN of an NB-TDD CDMA communication system.

It is also a further object of the present invention to provide a method of grouping a plurality of sync codes for each FPACH and P-RACH and assigning an FPACH and a P-RACH according to the group of a received sync code in a random access procedure in an NB-TDD CDMA communication system.

It is still another object of the present invention to provide a method of transmitting a signal including information about a sub-frame having an FPACH from a UTRAN so that a UE monitors only the designated sub-frame to receive an acknowledgement for a sync code sent by the UE.

It is yet another object of the present invention to provide a method of minimizing a signal collision probability and increasing P-RACH assignment efficiency by confirming the acknowledgment for a sync code by an FPACH signal after the sync code is acknowledged by an I_FPACH (Index FPACH) signal.

The foregoing and other objects are achieved by providing an uplink random access procedure in an NB-TDD system. To achieve an acknowledgement for data transmission from a UTRAN, a UE selects one of a plurality of sync codes by which the UTRAN identify UEs that request data transmission and transmits the selected sync code in a time slot of a sub-frame to the UTRAN. Then, the UE receives the sync code information, information about the arrival time of the sync code, time update information indicating a variation in the transmission time of data, and power information indicating an adjustment to a power gain in the UE from the UTRAN on an FPACH. The UE transmits the data on a P-RACH mapped from the FPACH according to the time update information and the power information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

The present invention provides a method of efficiently using P-RACH resources and reducing the time required for acquiring the P-RACH, which is the time between transmission of a SYNC1 code (hereinafter, referred to as a sync code) and transmission of RACH data on P-RACH, by modifying the existing mapping relationship between sync codes and FPACHs. Also, a method of acknowledging a plurality of sync codes on one FPACH is provided.

In accordance with an embodiment of a random access procedure according to the present invention, one FPACH transmits acknowledgments (ACKs) for a plurality of sync codes without mapping the sync codes to FPACHs/P-RACHs, thereby increasing channel efficiency. Upon receipt of a sync code from a UE, a UTRAN selects an FPACH and a P-RACH arbitrarily. The resulting increases in the use efficiency of the FPACH and P-RACH resources and reduces the time required to acknowledge each sync code.

In accordance with another embodiment of the random access procedure according to the present invention, one FPACH transmits ACKs for a plurality of sync codes at the same time by changing the conventional mapping relationship between FPACHs and P-RACHs. Therefore, forward resources are efficiently used as compared to the conventional random access procedure.

In accordance with a third embodiment of a random access procedure according to the present invention, an I_FPACH signal is used to reduce the complexity for evaluating all of FPACHs and efficiently use forward resources as compared to the conventional RACH assignment method.

Figure 1:
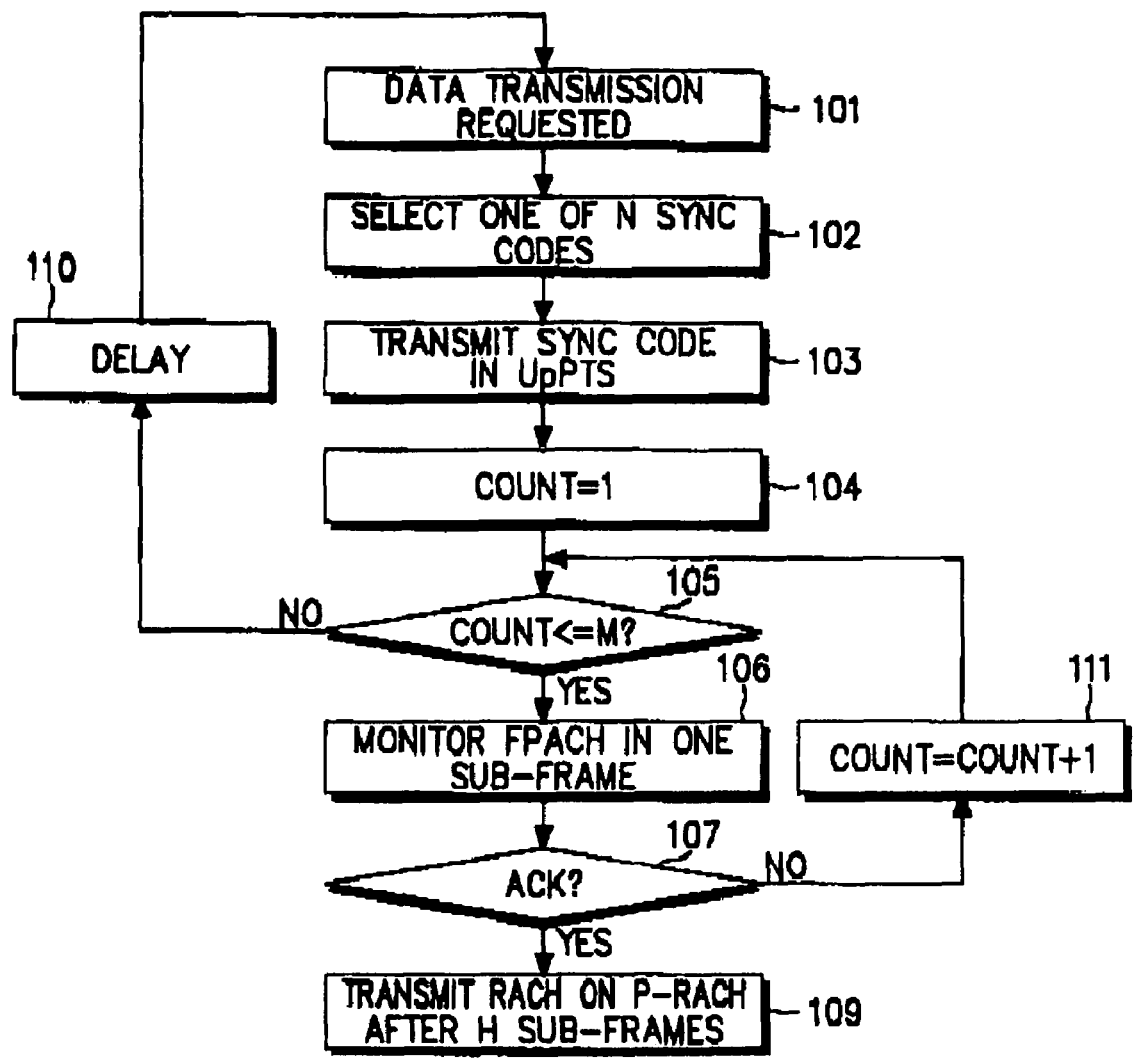
FIG. 1 is a flowchart illustrating a procedure of acquiring a P-RACH on which to transmit data to a UTRAN in a UE according to an embodiment of the present invention.

FIG. 1 is a flowchart illustrating a procedure of acquiring a P-RACH on which to transmit data to a UTRAN in a UE according to an embodiment of the present invention. Referring to FIG. 1, the UE has RACH data to be transmitted in step 101. Here, it is assumed that the UE has primarily acquired downlink synchronization and received RACH transmission associated information beforehand from the UTRAN. Information about N sync codes available to the UE can be received from the UTRAN beforehand or from preset codes. In step 102, the UE selects one of the N sync codes. An upper layer may set N. N can be a constant, for example, 8. If N is 8, it is preferable to use all the eight given sync codes to avoid channel collision. In step 103, the UE transmits the selected sync code in an UpPTS. While in this step, the UE operates to acquire uplink synchronization, but this is beyond the scope of the present invention and will not be described.

The UE initializes the counter to count sub-frames received after the transmission of the sync code in step 104. The count value indicates the number of sub-frames that the UE monitors to acquire an FPACH signal having an ACK for the transmitted sync code. In step 105, the UE compares the count value with the maximum number of sub-frames to be monitored, M. If the count value is less than or equal to M, which implies that there are still sub-frames to be monitored, the procedure goes to step 106. If the count value is greater than M, which implies that the UE fails to receive the FPACH within the M sub-frames, it transmits the sync code again to request an RACH in step 110.

In step 106, the UE receives an FPACH and checks whether the FPACH includes an ACK for the transmitted sync code. The FPACH has information indicating how many sub-frames the transmitted sub-frame with the sync code is apart from the current sub-frame. Therefore, even if another UE transmitted the same sync code in a different sub-frame, the UE can discriminate its own FPACH from an FPACH for the other UE. Also, the UE can determine whether the FPACH is for the UE based on the sync code and sub-frame information of the FPACH signal. Since the sync code set in the FPACH signal can be identical to or different from the sent sync code, the UE monitors an FPACH in each sub-frame and determines whether the FPACH has the ACK for the sent sync code. If one sub-frame has a plurality of FPACHs, the UE monitors all the FPACHs. This is advantageous in the sense that a time delay is reduced as compared to a conventional system with the one-to-one mapping relationship between sync codes and FPACHs. Another advantage is that all FPACHs and P-RACHs are fully utilized thereby increasing the use efficiency of resources. An FPACH corresponds to one or more P-RACHs. If one FPACH corresponds to two or more P-RACHs, the matching relationship between the FPACH and the P-RACHs is known from UTRAN information beforehand or by including P-RACH information included in the FPACH information.

In step 107, the UE determines whether the received FPACH has an ACK for the sent sync code. If it does, the UE goes to step 108 and otherwise, it goes to step 111 where it increases the sub-frame counter by 1. Steps 105, 106, 107, and 111 occur up to M times. For example, if M is 2 and the ACK for the transmitted sync code is in the second sub-frame, the above steps occur twice. If the ACK is in the first sub-frame, the above steps are performed once.

In step 108, the UE transmits RACH data on a corresponding P-RACH, H sub-frames after receiving the FPACH. H is set to a predetermined value, for example, to 2. After receiving the ACK on the FPACH, the UE transmits RACH data on a P-RACH assigned after two sub-frames. If two or more P-RACHs are assigned in one sub-frame, the corresponding P-RACH is detected according to the relationship between FPACHs and P-RACHs provided by the UTRAN information. When the FPACH includes P-RACH information, there is no need for referring to the UTRAN information to know the corresponding relationship between the FPACH and the P-RACH.

Meanwhile, in the case where the UE fails to receive the ACK for the M sub-frames in step 105 and reattempts a RACH request in step 110, a physical layer reports the failure to a MAC layer and the MAC layer requests RACH transmission to the physical layer after a random delay time. Or the physical layer itself can attempt the random access after a predetermined time. After the predetermined time delay, the random access procedure starts again in step 102.

Figure 2:
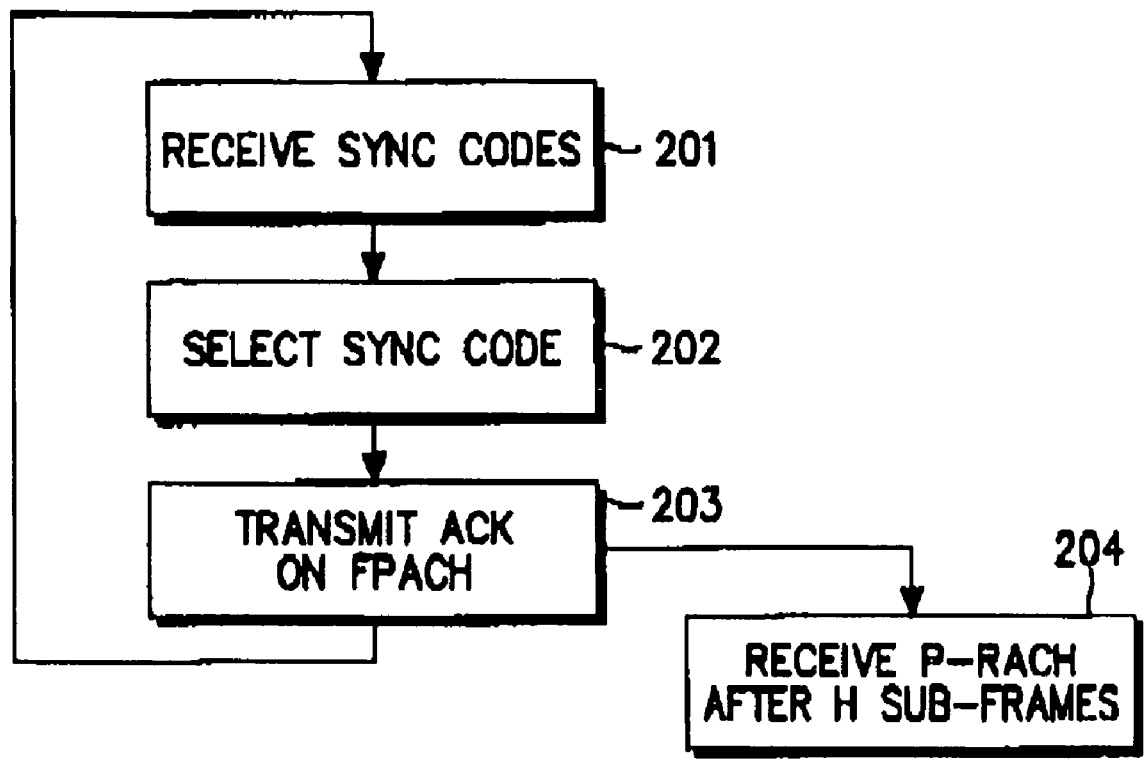
FIG. 2 is a flowchart illustrating a P-RACH assigning procedure in the UTRAN according to the embodiment of the present invention.

FIG. 2 is a flowchart illustrating a procedure of assigning a P-RACH via an FPACH with respect to a sync code received in an UpPTS in the UTRAN according to the embodiment of the present invention. Referring to FIG. 2, the UTRAN detects sync codes in UpPTSs of a sub-frame in step 201. In step 202, the UTRAN selects sync codes to be acknowledged via an FPACH among sync codes detected for the latest M sub-frames but not acknowledged, and the sync codes received in the current sub-frame. The UTRAN can transmit ACKs in one sub-frame for sync codes as many as or less than P-RACHs assigned per sub-frame.

The UTRAN transmits ACKs for the selected sync codes on an FPACH in step 203. The FPACH signal may include information about the selected sync codes, sub-frames in which the selected sync codes are received, and their transmission power correction and transmission time modification. The FPACH is a physical channel defined as one time slot and one channelization code. One FPACH may correspond to one or more P-RACHs. In other words, ACKs for a plurality of sync codes can be transmitted on one FPACH. Since there is no fixed matching relationship between sync codes and FPACHs in the present invention, an FPACH is arbitrarily selected for a specific sync code. In step 204, the UTRAN receives a P-RACH corresponding to the FPACH that transmitted the ACKS. The FPACH is H sub-frames ahead of the P-RACH. H is 2, for example. H is set in the UTRAN information or in the FPACH information.

In the P-RACH acquisition procedure in the UE, the UE selects one of N sync codes (stage 1). Upon receipt of sync codes from UEs in UpPTSs, the UTRAN selects the sync code among the received ones and transmits an ACK on an FPACH within M sub-frames (stage 2). Upon receipt of the FPACH signal, the UE transmits data on a P-RACH associated with the FPACH, H sub-frames after the FPACH reception (stage 3).

As stated before, N is the number of sync codes assigned to one cell, larger than 1. N can be 8 for example. M is equal to the number of P-RACHs/FPACHs per sub-frame assigned to the cell, L. Alternatively, M can be determined by L and N. M can also be known from UTRAN information. For example, if N is 8 and L is 2, M can be 2.

Table 1 illustrates the mapping relationship among sync codes and FPACHs, and P-RACHs according to the embodiment of the present invention.

TABLE 1

|  | Sub-frame number | | | | | | | |
|---|---|---|---|---|---|---|---|---|
|  | ... n | n + 1 | n + 2 | n + 3 | n + 4 | n + 5 | n + 6 | n + 7 ... |
| Selected sync codes | ... S1 S2 S3 | S2 S5 | S1 S3 S4 S6 | — | S8 | ... | ... | ... ... |
| FPACH | ... ... | F1_1_S2 F2_1_S3 | F1_2_S2 F2_1_S2 | F1_1_S3 F2_1_S4 | F1_2_S1 F2_2_S6 | F1_1_S8 — | ... | ... ... |
| P-RACH | ... ... | ... | ... | R1(n + 3) R2(n + 3) | R1(n + 4) R2(n + 5) | R1(n + 5) R2(n + 5) | R1(n + 6) R2(n + 6) | R1(n + 7) ... — |

In Table 1, N=8: the number of sync codes;

M=2: the number of sub-frames that the UE should monitor to acquire an ACK for its sync code, that is, the number of latest sub-frames with sync codes for which the UTRAN transmits ACKs;

L=2: the number of P-RACHs assigned per sub-frame;

H=2: the time distance (sub-frames) between an FPACH and a corresponding PRACH; and "selected sync codes" refer to sync codes selected by UEs among sync codes S1 to S8.

FPACHs are denoted by F_1_n_Sk and F_2_n_Sk. F_1_b_Sk is a first FPACH and F_2_n_Sk is a second FPACH. Here, n indicates the position of a sub-frame in which a sync code is received. If n is 1, the sync code related with F_1_1_Sk is received in the previous sub-frame. If n is 2, the sync code related with F_1_2_Sk is received two sub-frames before the current frame. Sk denotes a received sync code, one of S1 to S8. For example, in the case of F_1_1_S1, the first FPACH transmits an ACK to a sync code S1 received in the previous sub-frame. In the case of F_1_2_S2, the first FPACH transmits an ACK to a sync code S2 received two sub-frames before the current frame.

P-RACHs are denoted by R1(n) and R2(n). R1(n) indicates the first P-RACH in an nth sub-frame and R2(n) indicates the second P-RACH in the nth sub-frame. R1(n) corresponds to the first FPACH in an (n−2)th sub-frame and R2(n) corresponds to the second FPACH in an (n−2)th sub-frame.

A description of the relationship among sub-frames, sync codes, and FPACHs & P-RACHs according to Table 1 when the UTRAN receives sync codes S1, S2, and S3 from three UEs in an nth sub-frame will be given herein below.

The UTRAN selects sync codes S1 and S3 and transmits ACKs on arbitrarily selected FPACHs in an (n+1)th sub-frame. The UTRAN transmits the ACK for the sync code S1 on the first FPACH (F1_1_S1) and the ACK for the sync code S3 on the second FPACH (F2_1_S3). According to Table 1, an FPACH is two sub-frames ahead of its corresponding P-RACH. Therefore, the UE, which transmitted the sync code S1 in the nth sub-frame, transmits RACH data on the first P-RACH (R1) in an (n+3)th sub-frame, and the UE, which transmitted the sync code S2 in the nth sub-frame, transmits RACH data on the second P-RACH (R2) in the (n+3)th sub-frame.

The UTRAN receives the sync codes S2 and S5 in an (n+1)th sub-frame. Among the sync code S2 that was received in the nth sub-frame but not acknowledged, and the sync codes S2 and S5 received in the (n+1)th sub-frame, the UTRAN selects the sync code S2 received in the nth sub-frame and the sync code S2 received in the (n+1)th sub-frame and transmits ACKs for the selected sync codes on FPACHs in an (n+2)th sub-frame. F1_2_S2 indicates that the first FPACH transmits the ACK for the sync code S2 received two sub-frames before the current sub-frame, that is, in the nth sub-frame, and F2_1_S2 indicates that the second FPACH transmits the ACK for the sync code S2 received in the previous frame, that is, in the (n+1)th sub-frame.

In the (n+2)th sub-frame, the UTRAN detects four sync codes S1, S3, S4, and S6. The UTRAN selects sync codes S3 and S4 and transmits ACKs for the selected sync codes S3 and S4 on the first FPACH (F1_1_S3) and the second FPACH (F2_1_S4) in an (n+3)th sub-frame. Then, the UTRAN transmits ACKs for the other sync codes S1 and S6 on the first FPACH (F1_2_S1) and the second FPACH (F2_2_S6) in an (n+4)th sub-frame. The UEs, which transmitted the sync codes S3 and S4, transmit RACH data on the P-RACHs (R1 and R2) in an (n+5)th sub-frame and the UEs, which transmitted the sync codes S1 and S6, transmit RACH data on the P-RACHs (R1 and R2) in an (n+6)th sub-frame.

The UTRAN receives a sync code S8 in the (n+4)th sub-frame and transmits an ACK for the sync code S8 on the first FPACH in an (n+5)th sub-frame. Then, the UE transmits RACH data on the first P-RACH in an (n+7)th sub-frame. The UE that transmitted the sync code S5 in the (n+1)th sub-frame fails to receive an ACK for the sync code S5. This occurs due to temporal concentration of traffic.

In the case where the overall traffic is not large but traffic is likely to be concentrated as shown in the above example, all UEs that transmit sync codes can be assigned to P-RACHs by increasing M. This method will be described referring to FIG. 3.

According to another embodiment of the present invention, all available sync codes can be fully utilized even if P-RACHs per sub-frame is less than the available sync codes to thereby minimize a collision probability. For convenience' sake, the number of available sync codes is 8 and the number of P-RACHs per sub-frame is 2, by way of example.

In the conventional random access procedure, a one-to-one corresponding relationship is set between sync codes and P-RACHs. Therefore, if two P-RACHs are assigned in one sub-frame, more than two sync codes cannot be used. When many UEs request P-RACHs, the probability of selecting the same sync codes increases and as a result, an RACH collision probability is also increased. This problem can be solved in the present invention.

Figure 3:
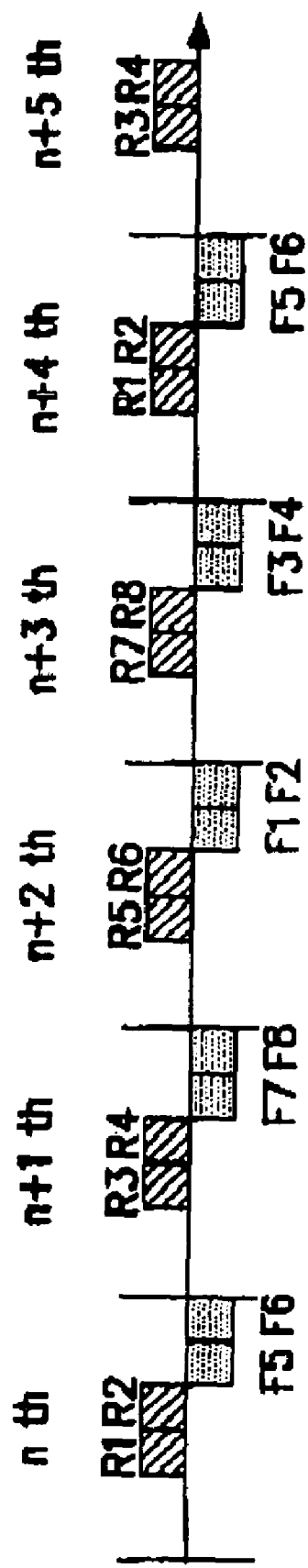
FIG. 3 illustrates assignment of FPACHs and P-RACHs according to another embodiment of the present invention.

Referring to FIG. 3, each sub-frame has two P-RACHs and two FPACHs. In order to fully utilize all available sync codes, the P-RACHs and FPACHs of each sub-frame are numbered. That is, P-RACHs and FPACHs in an nth sub-frame are numbered R1, R2, F5, and F6, respectively. P-RACHs and FPACHs in an (n+1)th sub-frame are numbered R3, R4, F7, and F8, respectively. P-RACHs and FPACHs in an (n+2)th sub-frame are numbered R5, R6, F1, and F2, respectively. P-RACHs and FPACHs in an (n+3)th sub-frame are numbered R7, R8, F3, and F4, respectively. P-RACHs and FPACHs in an (n+4)th sub-frame are numbered R1, R2, F5, and F6, respectively. FPACHs and P-RACHs can be identified on a time slot basis.

When a UE transmits a sync code S1 in an nth sub-frame, it receives an FPACH F1 in an (n+2)th sub-frame, checks whether the FPACH has an ACK for the UE, and if it does, the UE transmits RACH data on a P-RACH R1 in an (n+4)th sub-frame. That is, after transmitting a sync code Sk, the UE receives an FPACH Fk and if it receives an ACK via the FPACH Fk, the UE transmits RACH data on a P-RACH Rk. The time distance between a sync code and a corresponding FPACH is known from UTRAN information. Or is determined by the number of sync codes, the number of FPACHs per sub-frame, and the number of P-RACHs per sub-frame by $$M = \left\lfloor \frac{A}{B} \right\rfloor \quad (1)$$

where A is the number of sync codes, B is the number of FPACHs or P-RACHs per sub-frame, M is the maximum number of sub-frames to monitor to acquire a corresponding FPACH after transmission of a sync code, and $\lfloor x \rfloor$ is a minimum integer larger than x. If A=8 and B=2, then M=4.

A sub frame with an FPACH is determined by a sync code selected by a UE. If the UE transmits a sync code S1 in an nth sub-frame, it receives an FPACH F1 two sub-frames later, that is, in an (n+2)th frame. If the UE transmits a sync code S3 in the nth sub-frame, it receives an FPACH F3 three sub-frames later, that is, in an (n+3)th frame. If the UE transmits a sync code S5 in the nth sub-frame, it receives an FPACH F5 four sub-frames later, that is, in an (n+4)th frame. In a system where it is possible to receive an FPACH in the same sub-frame as transmits a sync code, the UE, which selects a sync code S5 or S6 in a specific sub-frame, receives an FPACH F5 or F6 in the same sub-frame. If the UE selects a sync code S7 in the nth sub-frame, it receives an FPACH F7 in the following sub-frame, that is, in an (n+1)th sub-frame. UEs, which select sync codes S2, S4, S6, and S8, receive FPACHs in the same manner.

The UTRAN also operates according to the above procedure. For example, the UTRAN transmits ACKs for sync codes S5 and S6 among sync codes received in the nth to (n+3)th sub-frames or in the (n+1)th to (n+4)th sub-frames on FPACHs F5 and F6, respectively.

After receiving the ACK on an FPACH, the UE transmits RACH data on a P-RACH corresponding to the FPACH. The relationship between the FPACH and the P-RACH is preset or known from the UTRAN information. In FIG. 3, it is assumed that the FPACH is two frames ahead of the P-RACH. That is, FPACHS F5 and F6 in the nth sub-frame correspond to P-RACHs R5 and R6 in the (n+2)th sub-frame, and FPACHS F7 and F8 in the (n+1)th sub-frame correspond to P-RACHs R7 and R8 in the (n+3)th sub-frame. Therefore, available sync codes can be fully utilized even when less P-RACHs than the sync codes are assigned to each sub-frame. As a result, a collision probability is decreased as compared to the case where less sync codes than available are used.

In the random access procedure according to the second embodiment of the present invention, the UTRAN transmits information about the numbers of FPACHs and P-RACHs per sub-frame and the corresponding relationship between the FPACHs and the P-RACHs. The types and number of available sync codes may be preset or determined by the UTRAN and included in the UTRAN information (stage 1). The UE determines the length of a reception period, that is, the number of sub-frames to be monitored for an ACK based on the number of sync codes and the number of FPACHs or P-RACHs. The number of sync codes is the total number of available sync codes. One sync code may correspond to one FPACH or P-RACH or a group of sync codes may correspond to one FPACH or P-RACH. In the latter case, A in equation (1) becomes the number of sync code groups (stage 2). The UE transmits a selected sync code in a UpPTS of a sub-frame and receives a corresponding FPACH (stage 3). After receiving sync codes in UpPTSs, the UTRAN selects one of the sync codes received for M sub-frames corresponding to an FPACH available to transmit an ACK in the current sub-frame and transmits the ACK for the selected sync code on the FPACH (stage 4). Upon receipt of the ACK, the UE transmits RACH data on a P-RACH corresponding to the received FPACH (stage 5).

Assignment of FPACHs to sub-frames in the UTRAN is determined by the number of sync codes (or the number of sync code groups) and the number of FPACHs/P-RACHs per sub-frame. If the number of sync code groups is G and the number of FPACHs/P-RACHs per sub-frame is Q, G is equal to or greater than Q. Then, FPACHs are assigned in the following way.

If K*Q=least common multiple (G, Q), K is a minimum period in which the same sync code group is mapped to a corresponding FPACH, expressed in the number of sub-frames.

(1) If K is a multiple of 2, frames each having two sub-frames are subject to a K/2 modulo operation and Q FPACHs with successive indexes are sequentially assigned to each of sub-frames starting with the first sub-frame of a frame with a remainder of 0. Herein, the K/2 modulo is a remainder of K divided by 2.

(2) If K is not a multiple of 2, frames each having two sub-frames are subject to a K/2 modulo operation and Q FPACHs with successive indexes are assigned to the first sub-frame of a frame with a remainder=0 through a Kth sub-frame and then Q FPACHs with successive indexes are assigned to each of K more sub-frames.

FIG. 3 illustrates the case with G=8, Q=2, and K=4.

Table 2 illustrates an FPACH assignment method according to the second embodiment of the present invention when G=4, Q=3, and K=2.

TABLE 2

| nth frame | | (n + 1)th frame | | (n + 2)th frame | | (n + 3)th frame | | (n + 4)th frame | |
|---|---|---|---|---|---|---|---|---|---|
| $1^{st}$ sub-frame | $2^{nd}$ sub-frame | $1^{st}$ sub-frame | $2^{nd}$ sub-frame | $1^{st}$ sub-frame | $2^{nd}$ sub-frame | $1^{st}$ sub-frame | $2^{nd}$ sub-frame | $1^{st}$ sub-frame | $2^{nd}$ sub-frame |
| F1 | F4 | F3 | F2 | F1 | F4 | F3 | F2 | F1 | F4 |
| F2 | F1 | F4 | F3 | F2 | F1 | F4 | F3 | F2 | F1 |
| F3 | F2 | F1 | F4 | F3 | F2 | F1 | F4 | F3 | F2 |

Referring to Table 2, an nth frame has a remainder of 0 from a K/2(=2) modulo operation. FPACHs F1, F2, and F3 are assigned to the first sub-frame of the nth frame and then FPACHs F4, F1, and F2 are assigned to the second sub-frame. An (n+1)th frame has a remainder of 1 after the K/2 modulo operation. An (n+2)th frame has a remainder of 0 after the K/2 modulo operation like the nth frame and the sequence of the assigned FPACHs is the same as that in the nth frame.

Figure 4:
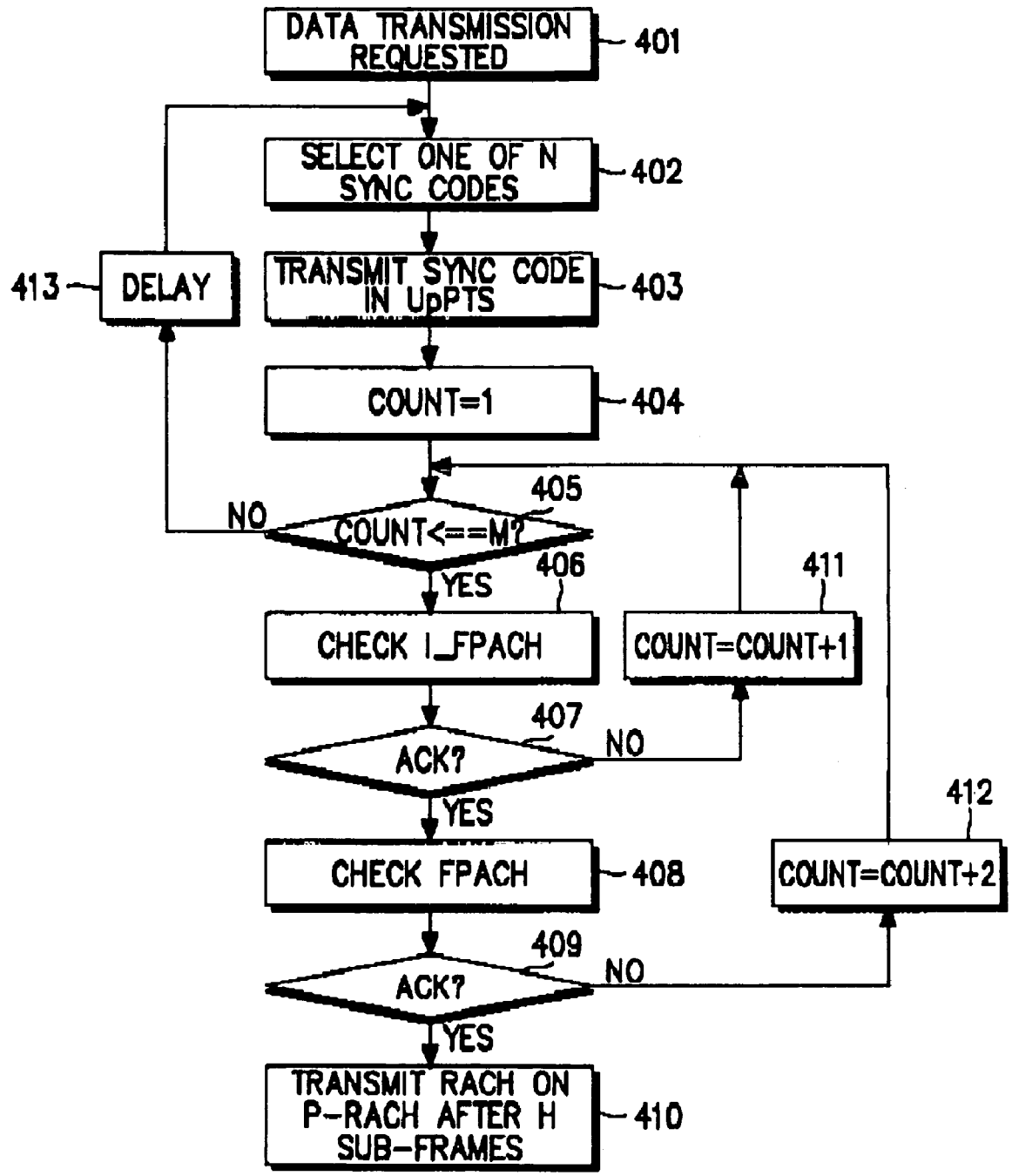
FIG. 4 is a flowchart illustrating a procedure of acquiring a P-RACH on which to transmit data to a UTRAN in a UE according to a third embodiment of the present invention.

FIG. 4 is a flowchart illustrating a P-RACH acquisition procedure in a UE according to a third embodiment of the present invention. Referring to FIG. 4, RACH data to be transmitted is generated in the UE in step 401. It is assumed here that the UE has primarily acquired synchronization to the base station and received information related with RACH transmission from the base station. The UE may receive information about available sync codes in the UTRAN information or use designated sync codes. In step 402, the UE selects one of N sync codes. N is set by an upper layer or is set to a constant, for example, 8. If one cell has eight sync codes, it is preferable to fully utilize all the sync codes to avoid collision. The UE can select a sync code randomly.

The UE transmits the selected sync code in a UpPTS in step 403. At the same time the UE tries to acquire uplink synchronization. In step 404, the UE initialize the counter. The counter value is the number of sub-frames that was monitored for an acknowledgement of the transmitted sync code, that is, I_FPACH. If the maximum number, M, of sub-frames to be monitored for the I_FPACH is 1, steps 405, 411, 412, and 413 can be omitted. M is transmitted as a signal message from an upper layer or determined according to the number of P-RACHs per sub-frame.

In step 405, the UE compares the current counter value with M. If the counter value is less than or equal to M, the UE goes to step 406. On the other hand, if the count is greater than M, which implies that the UE fails to receive an ACK within the M sub-frames, the UE goes to step 413 to attempt retransmission of the sync code.

In step 406, the UE receives and checks whether the I_FPACH is for the transmitted sync code. One I_FPACH exists in each sub-frame and includes information about the types and arrival times of the sync codes that the UTRAN acknowledges. The UTRAN can acknowledge up to eight sync codes using the I_FPACH. Based on the information of the I_FPACH, the UE can determine whether the transmitted sync code is acknowledged and discriminate its own sync code from the same sync code selected by a different UE in a different sub-frame. The UE can identify the sub-frame in which it transmitted the sync code based on the sub-frame information in the I_FPACH. That is, the I_FPACH indicates how many sub-frames the transmitted sub-frame is apart from the current sub-frame. Therefore, even if different UEs transmit the same sync code in different sub-frames, the UTRAN can distinguish the UE that transmits the sync code in a specific sub-frame and transmit an ACK to the UE. Also, the UE can determine whether the ACK is for the UE based on the sync code and sub-frame information included in the I_FPACH signal. The sync code information in the I_FPACH signal can be identical to or different from the sync code that the UE transmitted. The structure and encoding of the I_FPACH will be described later.

In step 407, the UE evaluates whether the received FPACH has an ACK for the transmitted sync code. If it does, the UE goes to step 408 and otherwise, it goes to step 411 where it increases the count by 1. Steps 405, 406, 407, and 411 can occur up to M times. For example, if M is 2 and an ACK for the transmitted sync code is in the second sub-frame, the above steps occur twice. If the ACK is in the first sub-frame, the above steps are performed once.

In step 408, the UE checks an FPACH designated by the I_FPACH and detects a transmission time variation and transmission power variation to be reflected on a P-RACH transmission. Here, the UE can confirm that the FPACH is assigned to the UE. Designation of an FPACH by the I_FPACH and the structure of the. FPACH will be described later. If it is confirmed that the FPACH is assigned to the UE in step 409, the procedure goes to step 410. Otherwise, the UE goes to step 412.

In step 410, the UE transmits RACH data on a corresponding P-RACH, H sub-frames after receiving the FPACH. H can be set to a predetermined value, for example, 2. After receiving an ACK signal on the FPACH, the UE transmits RACH data on a P-RACH assigned after two sub-frames. If two or more P-RACHs are assigned in one sub-frame, the mapping relationship between FPACHs and P-RACHs is known from UTRAN information. Therefore, if the ACK is received on the FPACH, a P-RACH after H sub-frames is available to the UE. When the FPACH includes P-RACH information, there is no need for setting the matching relationship between the FPACH and the P-RACH in the UTRAN information.

In the case where the UE fails to receive the ACK for the M sub-frames in step 405, it reinitiates the RACH access procedure in step 413. In this case, a physical layer reports the failure to a MAC layer and the MAC layer requests RACH transmission to the physical layer after a random delay time. Or the physical layer can attempt the RACH transmission after a predetermined time. After the predetermined time delay, the RACH channel assignment procedure starts again. That is, if the UE fails to receive the I_FPACH signal for the transmitted sync code for a predetermined time, it retransmits the sync code again. If the UE fails to receive an ACK signal on the I_FPACH in step 407, it increases the count by 1 in step 411. If the UE fails in the FPACH confirmation in step 409, it increases the count by 2 in step 412.

Figure 5:
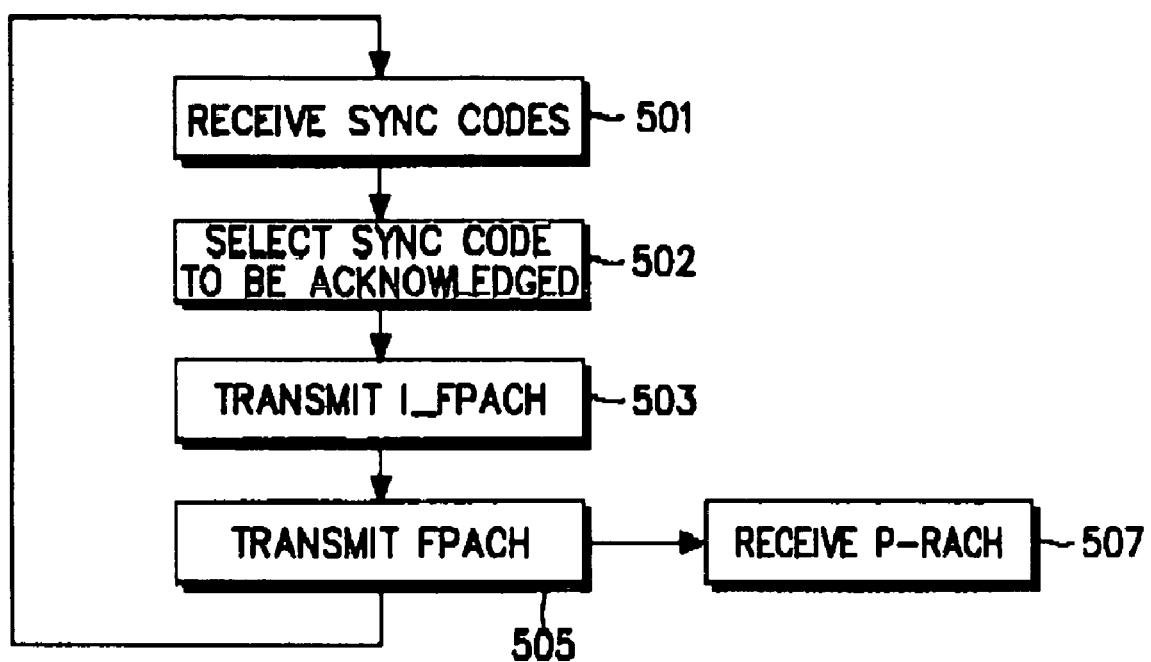
FIG. 5 is a flowchart illustrating a P-RACH assigning procedure in the UTRAN according to the third embodiment of the present invention.

FIG. 5 is a flowchart illustrating a procedure of assigning a P-RACH by an I_FPACH and an FPACH with respect to a sync code received in an UpPTS from a UE in a UTRAN according to the third embodiment of the present invention. Referring to FIG. 5, the UTRAN receives sync codes in step 501. In step 502, the UTRAN selects sync codes to be acknowledged by FPACHs from among sync codes received for the latest M sub-frames but not acknowledged, and the sync codes received in the current sub-frame. The UTRAN can transmit ACKs in one sub-frame for as many sync codes as or sync codes less than P-RACHs assigned in each sub-frame.

The UTRAN transmits ACKs for the selected sync codes on an I_FPACH in step 503. The I_FPACH signal may include information about the indexes of the selected sync codes and sub-frames in which the selected sync codes have been received. In step 504, the UTRAN transmits FPACH signals including additional information about variations of transmission power and variations of transmission time for the selected sync codes. Besides, the FPACH can include confirmation information by which the UEs can confirm the ACKs for their sync codes after the UEs receive them by the I_FPACH. The confirmation prevents signal collision-induced errors and increases reliability. The FPACH signal is transmitted one sub-frame after the I_FPACH. One FPACH can correspond to one or more P-RACHs. That is, ACK signals for a plurality of sync codes can be transmitted on one FPACH. Since there is no mapping relationship between a sync code and an FPACH in the present invention, an arbitrary FPACH can be selected for a specific sync code. As compared to the conventional one-to-one correspondence between the FPACH and the P-RACH, P-RACHs can be assigned immediately when they are available. Therefore, P-RACH resources are efficiently used and a delay in the random access procedure is reduced.

In step 505, the UTRAN receives a P-RACH corresponding to the FPACH. The FPACH is H sub-frames ahead of the P-RACH. H is 5, for example. H is the temporal distance between the FPACH and the P-RACH, indicating their corresponding relationship. Each FPACH corresponds to a PRACH after H sub-frames. H is set in the UTRAN information or included in the FPACH information.

In the P-RACH acquisition procedure according to the second embodiment, a UE selects one of N sync codes and transmits it to a UTRAN in an UpPTS (stage 1). Upon receipt of sync codes from UEs, the UTRAN selects the sync code and transmits an ACK for the selected sync code by an I_FPACH signal within M sub-frames (stage 2). One sub-frame after receiving the I_FPACH signal, the UE receives additional information on an FPACH and transmits data on a P-RACH associated with the FPACH H sub-frames after the FPACH reception (stage 3). N, the number of sync codes, is an integer larger than 1. N can be 8 for example.

Now a description of I_FPACH characteristic of the present invention will be described herein below.

The UE can determine whether there is an ACK for its sync code from the information of an I_FPACH signal without monitoring an FPACH in each sub-frame. Upon receipt of the ACK signal, the UE checks an FPACH received one sub-frame later from the UTRAN. The UE obtains sync code information by which it confirms the ACK for the transmitted sync code and information about a P-RACH to be assigned to the UE from the FPACH. The UTRAN selects some of received sync codes and grants access to P-RACHs for the selected sync codes by the I_FPACH signal. The UTRAN can transmit ACKs for as many sync codes as P-RACHs per sub-frame at the same time on the I_FPACH. The maximum number of P-RACHs per sub-frame is the number of the sync codes. An ACK for each sync code includes the following information.

1. Index of sync code: The UTRAN transmits information about the index of a sync code selected among sync codes received and identified to be acknowledged by an I_FPACH signal. The UE determines for what sync code the I_FPACH signal includes an ACK from the sync code index information.

2. Arrival time of sync code: The UTRAN transmits information about the arrival time of the selected sync code by the I_FPACH signal. Thus, the UE can identify the same sync code transmitted in a different sub-frame and the number of sync codes available to UEs in each frame is maximized.

The bit number of a sync code index in bits, $l_{index}$ and the bit number of a sync code arrival time $l_{time}$ are calculated by $$l_{index} = \lceil \log_2 N \rceil \quad (2)$$

where N is the number of sync codes and $\lceil x \rceil$ is a minimum integer larger than x.

$$l_{time} = \lceil \log_2 M \rceil \quad (3)$$

where M is the number of sub-frames in which the UE monitors I_FPACHs, that is, the maximum number of sub-frames having information about sync codes for which the UTRAN transmits ACKs. The UE should monitor M sub-frames to determine whether the I_FPACH in each sub-frame has an ACK for the sync code that it sent. If the UE fails to receive an ACK for the M sub-frames, it attempts random access again after a predetermined delay.

Figure 6:
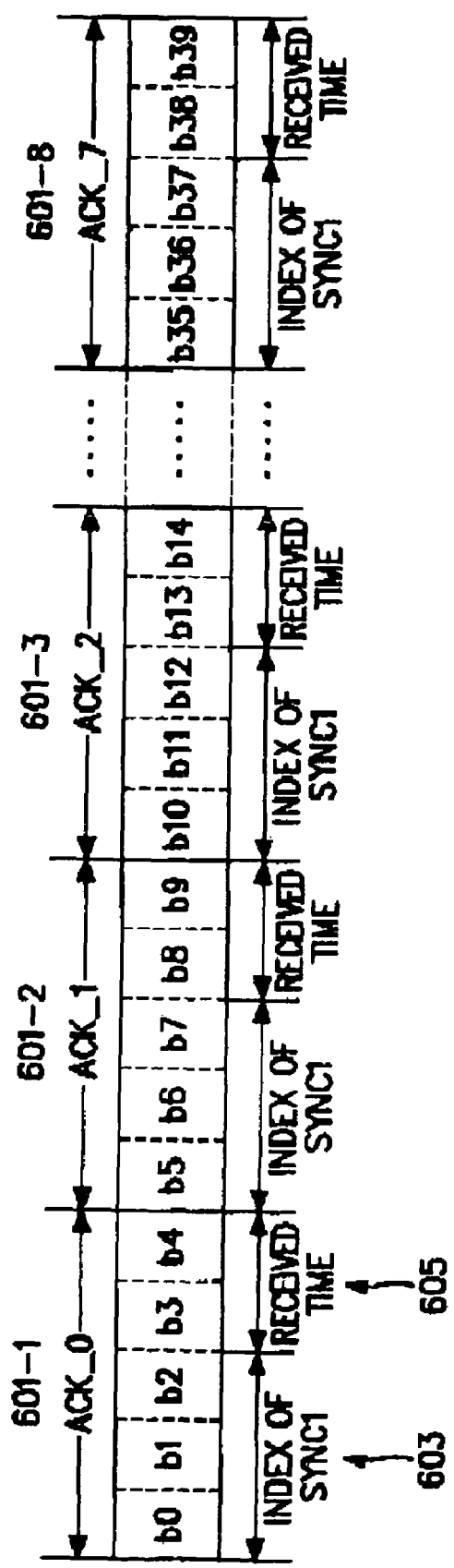
FIG. 6 illustrates the structure of an I_FPACH signal according to the third embodiment of the present invention.

FIG. 6 illustrates the structure of the I_FPACH according to the third embodiment of the present invention. Here, the number of P-RACHs per sub-frame is 8, the number of sync codes is also 8, and the UE should monitor the I_PACH in 4 successive sub-frames. Referring to FIG. 6, the I_FPACH according to the present invention is comprised of eight ACK areas, ACK_0 (601-1), ACK_01(601-2), . . . , ACK_7 (601-8). Each ACK area has a 3-bit sync code index 603 and a 2-bit sync code arrival time 605 to indicate an ACK for one sync code. Therefore, the I_FPACH has a total of 40 bits.

The I_FPACH can be encoded using convolutional encoder or block encoder. In the case of convolutional encoding, a convolutional encoder with a data rate 1/2 or 1/3 supported in the NB-TDD system can be used. In the case of block encoding, the number of input information bits, n is determined by $$n = l_{index} + l_{time} = \lceil \log_2 N \rceil + \lceil \log_2 M \rceil \quad (4)$$

and the number of output coded bits, m is determined by $$m = \left\lceil \frac{88}{N} \right\rceil \quad (5)$$

where M and N are identical in denotation to M and N in Eq. 2 and Eq. 3.

Figure 7:
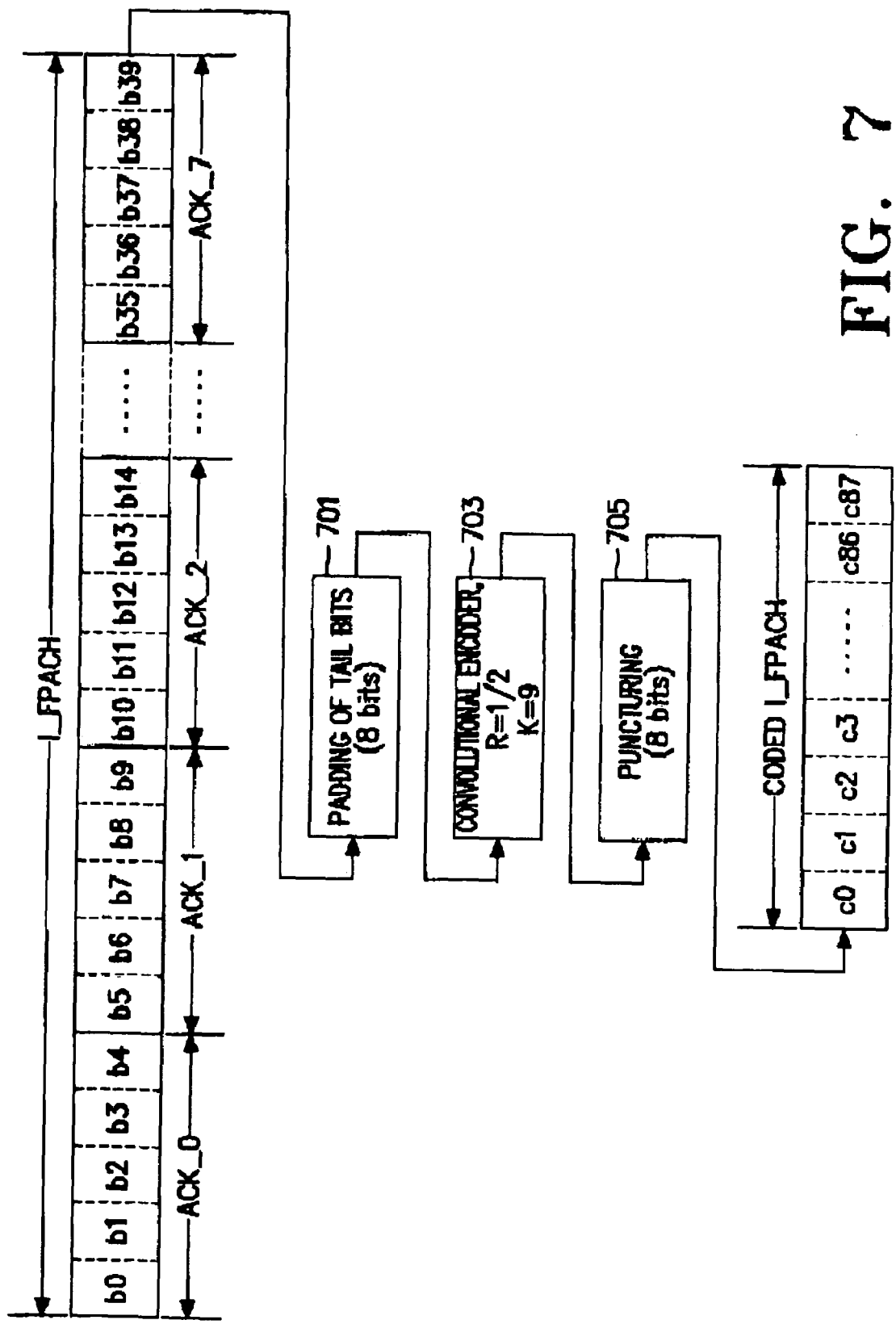
FIG. 7 illustrates convolutional encoding of the I_FPACH shown in FIG. 6 in a convolutional encoder with a code rate 1/2 and a constraint length 8 according to the third embodiment of the present invention.

FIG. 7 illustrates convolutional encoding of the I_FPACH according to the third embodiment of the present invention. Here, a code rate is 1/2 and a convolutional encoder with constraint length=9 is used. 8 tail bits are concatenated to 40-bit I_FPACH information 701. For the input of the I_FPACH information, the convolutional encoder 703 outputs 96 bits. Then, 8 bits are punctured from the 96 bits in a puncturer 705. Thus, an 88-bit coded I_FPACH signal is output as an NB-TDD forward physical channel has 88 bits.

Figure 8:
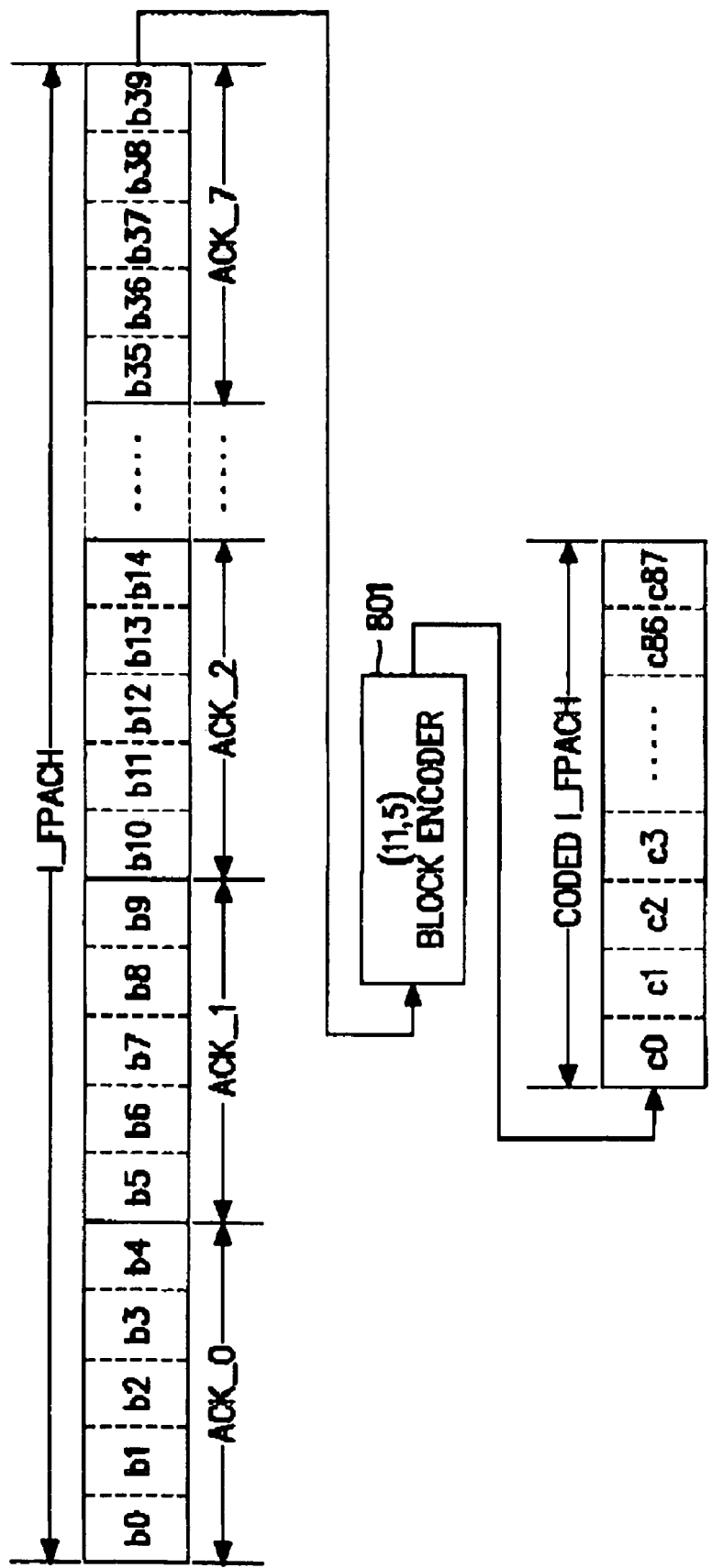
FIG. 8 illustrates block encoding of the I_FPACH shown in FIG. 6 in a (11, 5) block encoder according to the third embodiment of the present invention.

FIG. 8 illustrates block encoding of the I_FPACH according to the third embodiment of the present invention. Here, m=11 and n=5 according to Eq. 4 and Eq. 5. The eight ACK areas of the I_FPACH are encoded in a block encoder 801 and an 88-bit coded I_FPACH is output. As shown in FIG. 6, for the input of the 40-bit IFPACH, the (11, 5) block encoder 801 block-encodes on a 5-bit basis and outputs 11 bits. Therefore, the coded I_FPACH signal has a total of 88 bits.

If the number of sync codes per sub-frame is greater than that of the P-RACHs per sub-frame, or they are the same but the number of sync codes that the UTRAN can detect in a sub-frame is less than that of P-RACHs per sub-frame, the UTRAN can transmit ACK signals for the same sync codes repeatedly. ACK repetition times common to each selected sync code is calculated by $$R_1 = \left\lfloor \frac{N}{A} \right\rfloor \quad (6)$$

and the number of ACKs to be repeated one more time is calculated by $$R_2 = \left\{ \frac{N}{A} - \left\lfloor \frac{N}{A} \right\rfloor \right\} \times A \quad (7)$$

In Eq. 6 and Eq. 7, $\lfloor x \rfloor$ is a maximum integer equal to or less than x, N is the number of sync codes, and A is the number of sync codes that the UTRAN acknowledges in one sub-frame. For reference, the maximum value of A is identical to the number of P-RACHs per sub-frame. The UTRAN selects $R_2$ ACKs from A ACKs and repeats them one more time.

Figure 9:
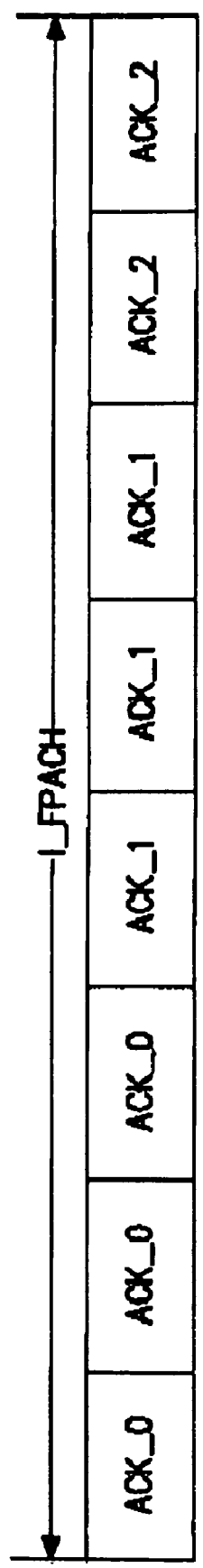
FIG. 9 illustrates repetition of ACKs when the number of ACKs in the I_FPACH is less than the number of P-RACHs per sub-frame or the number of sync codes is greater than the number of P-RACHs according to the third embodiment of the present invention.

FIG. 9 illustrates repetition of the same ACK in an I_FPACH signal according to the third embodiment of the present invention. Here, it is assumed that the number of sync codes is 8, the number of P-RACHs is 3, and the number of sync codes acknowledgeable in one sub-frame is 3. As shown in FIG. 9, three ACKs occur basically twice according to Eq. 6. That is, since A is 3 and N is 8, a maximum integer equal to or less than [8/3] is 2. Therefore, each ACK occurs twice commonly and two of three ACKs (ACK_0 and ACK_1) are repeated one more time according to Eq. 7. Specifically, $R_2$= (2.67−2)×3≅2. Thus, two of three ACKs are repeated one more time.

A method of transmitting ACKs for a plurality of sync codes on one FPACH according to a third embodiment of the present invention will be described herein below.

The FPACH includes the following information in a random access procedure according to the present invention.

1. Transmission power variation: The UTRAN informs the UE of the difference between the reception power of a sync code transmitted by the UE and its requested reception power.

2. Transmission time variation: The UTRAN detects the arrival time of the sync code sent by the UE in an UpPTS, calculates a variation in the transmission time of a P-RACH signal based on the sync code arrival time, and informs the UE of the transmission time variation.

3. Reconfirmation value for acknowledgement: The UE can reconfirm an ACK for the sync code transmitted by the UE after confirming it by an I_FPACH signal.

Table 3 lists the number of bits assigned to each information versus a range of representable values.

TABLE 3

| | Length [bits] (maximum/minimum) | Range (maximum/minimum) | Resolution (maximum/minimum) | Remarks |
|---|---|---|---|---|
| Transmission power variation | 4/5 | −24~24/−48~48 [dB] | 3/3 [dB] | requisite |
| Transmission time variation | 5/10 | −32~96/−32~96 [chip] | 4/0.125 [chip] | requisite |
| ACK confirmation value | $l_{index}/l_{index} + l_{time}$ | — | — | requisite |
| Reserved | 2 | — | — | Optional |
| Sum (maximum/minimum) | $9 + l_{index}/17 + l_{index} + l_{time}$ | — | — | — | where $l_{index}$ and $l_{time}$ denote the lengths of a sync code index and a sync code arrival time.

The length, value range, and resolution of each information in Table 1 are determined by the following:

1. Transmission power variation: A closed loop power control for an uplink dedicated channel has a dynamic range of 80 dB and a resolution of 1, 2, or 3 dB. When a UE transmits a sync code in an UpPTS for random access, it calculates allowable power based on the transmission power of a sync channel transmitted from a UTRAN. If the random access procedure is utilized as a preliminary step to access an uplink dedicated channel, another power control is performed on the dedicated channel. Therefore, there is no need for performing the closed loop power control as accurately as a conventional closed loop power control for the uplink dedicated channel. Therefore, the maximum and minimum of the resolution are both set to 3 dB and can be adjusted up to ±24 dB in a dynamic range of 48 dB if the transmission power variation is expressed in 4 bits and up to ±48 dB in a dynamic range of 96 dB if it is expressed in 5 bits.

Figure 10:
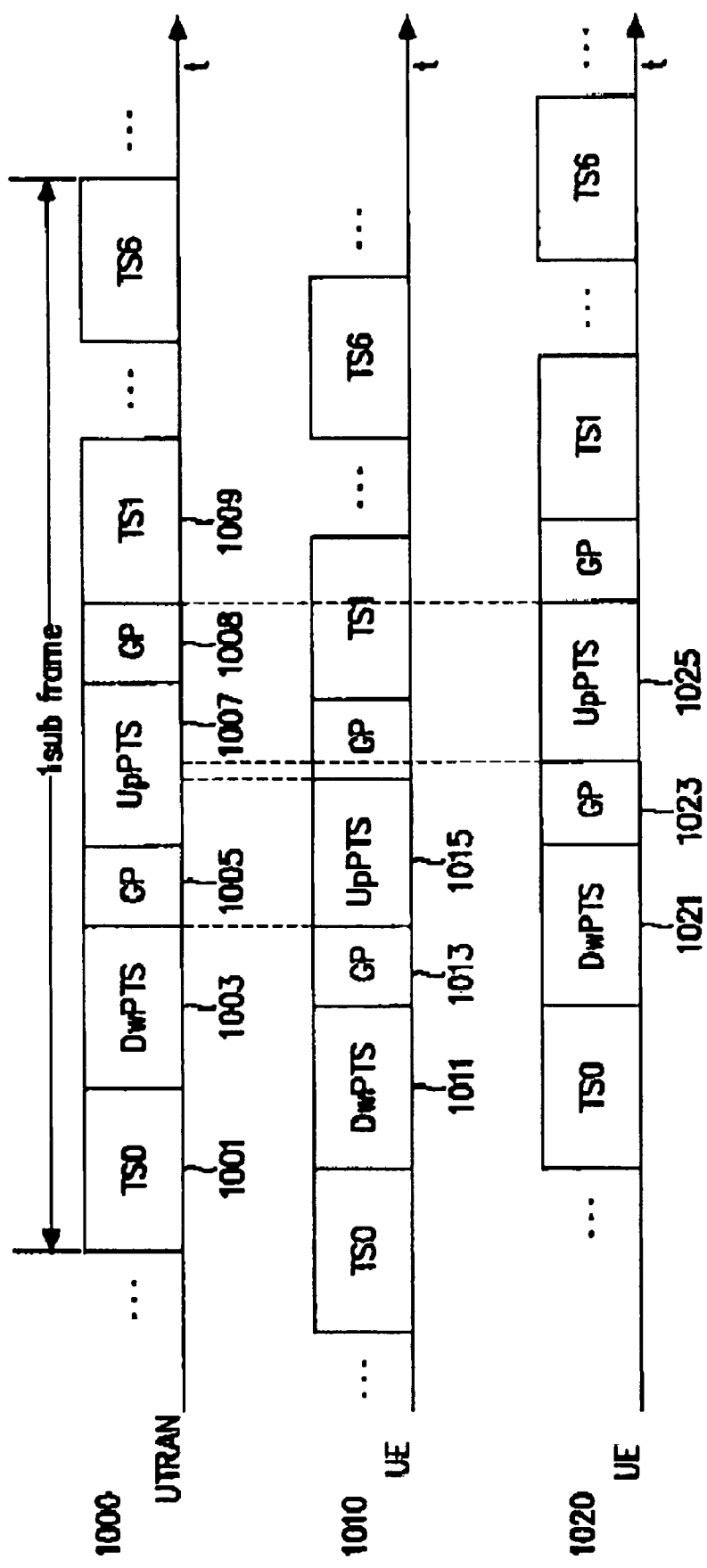
FIG. 10 illustrates the structure of an NB-TDD sub-frame and the arrival time of an UpPTS identifiable in the UTRAN according to the third embodiment of the present invention.

2. Transmission time variation: FIG. 10 illustrates the structure of an NB-TDD sub-frame and the arrival time of an UpPTS identifiable in a UTRAN. The UTRAN has a 96-chip guard period (GP) 1005 between an UpPTS 1007 and a DwPTS 1003 and a 32-chip GP 1008 between the UpPTS 1007 and time slot #1 (TS1) 1009 in a sub-frame. A UE 1010 and a UE 1020 have sub-frames of the same structure. If a sync code transmitted by the UE 1010 in an UpPTS 1015 arrives at the UTRAN 1000 before the UpPTS 1007 in the sub-frame of the UTRAN 1000, the UTRAN 1000 cannot identify the sync code. Thus, a maximum time variance is 96 chips. The UTRAN cannot identify a sync code that arrives later than the 32-chip GP 1008 either. Therefore, a minimum time variance is −32 chips. In order to represent a transmission time variation, 5 to 10 bits are used and the resolution of each bit ranges 4 to 0.125 chips in the present invention.

3. ACK confirmation value: The simplest way of confirming an ACK is to repeat the ACK for each sync code included in an I_FPACH signal. In this case, the length of the ACK confirmation value is calculated by $$l_{index} + l_{time} = |\log_2 N| + |\log_2 M| \quad (8)$$

where M and N are the same in denotation as M and N in Eq. 2 and Eq. 3.

The minimum length of the ACK confirmation value is $l_{index}$ when a sync code index is simply used or the sync code index is XOR-gated with a sync code arrival time.

4. Reserved: The reserved bits are used to include additional information in an FPACH or to change the bit number of the whole FPACH due to changes of each information range and resolution.

Figure 11:
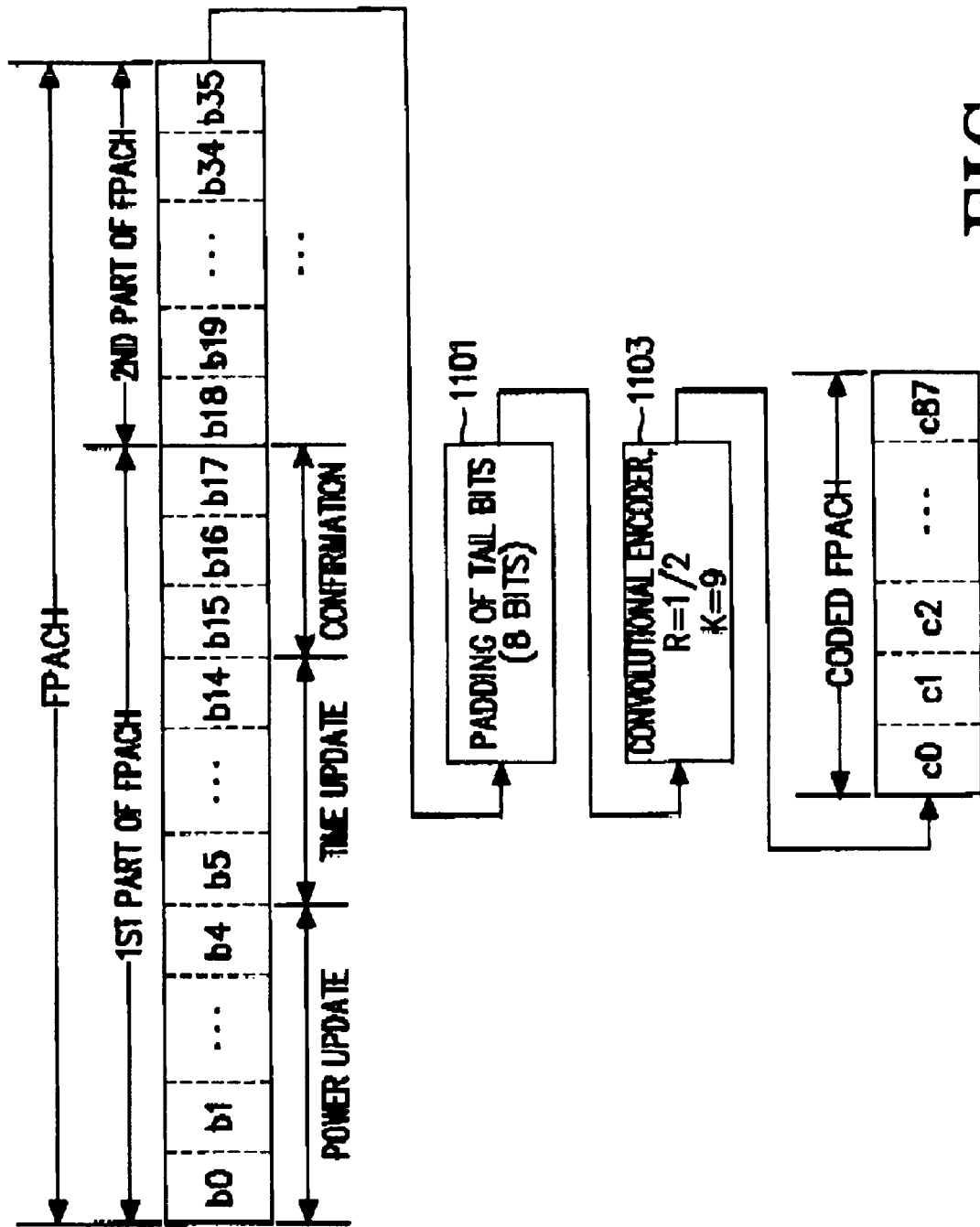
FIG. 11 illustrates a method of transmitting RACH data transmission-associated information to a plurality of UEs on one FPACH at the same time in a random access procedure according to the third embodiment of the present invention.

FIG. 11 illustrates the structure of an FPACH and convolutional encoding of the FPACH when a transmission power variation is 5 bits, a transmission time variation is 10 bits, an ACK confirmation value is 3 bits, and the variations are transmitted for two sync codes at the same time according to the third embodiment of the present invention. Here, the number of the bits of the FPACH can be changed. In FIG. 11, a code rate is 1/2 and a convolutional encoder has a constraint length of 9. 8 tail bits are concatenated to a 36-bit FPACH 1101 and then the convolutional encoder 1103 convolutionally encodes the resulting FPACH and outputs a 88-bit coded FPACH. If the FPACH is longer than 36 bits, the coded FPACH should be punctured. If 12 bits are assigned to an ACK for one sync code, ACKs for three sync codes can be transmitted on one FPACH at the same time. It is also possible to transmit an ACK for one sync code on one FPACH. In this case, the FPACH information can be encoded at a higher code rate and as a result, a more reliable FPACH transmission is ensured.

Figure 12:
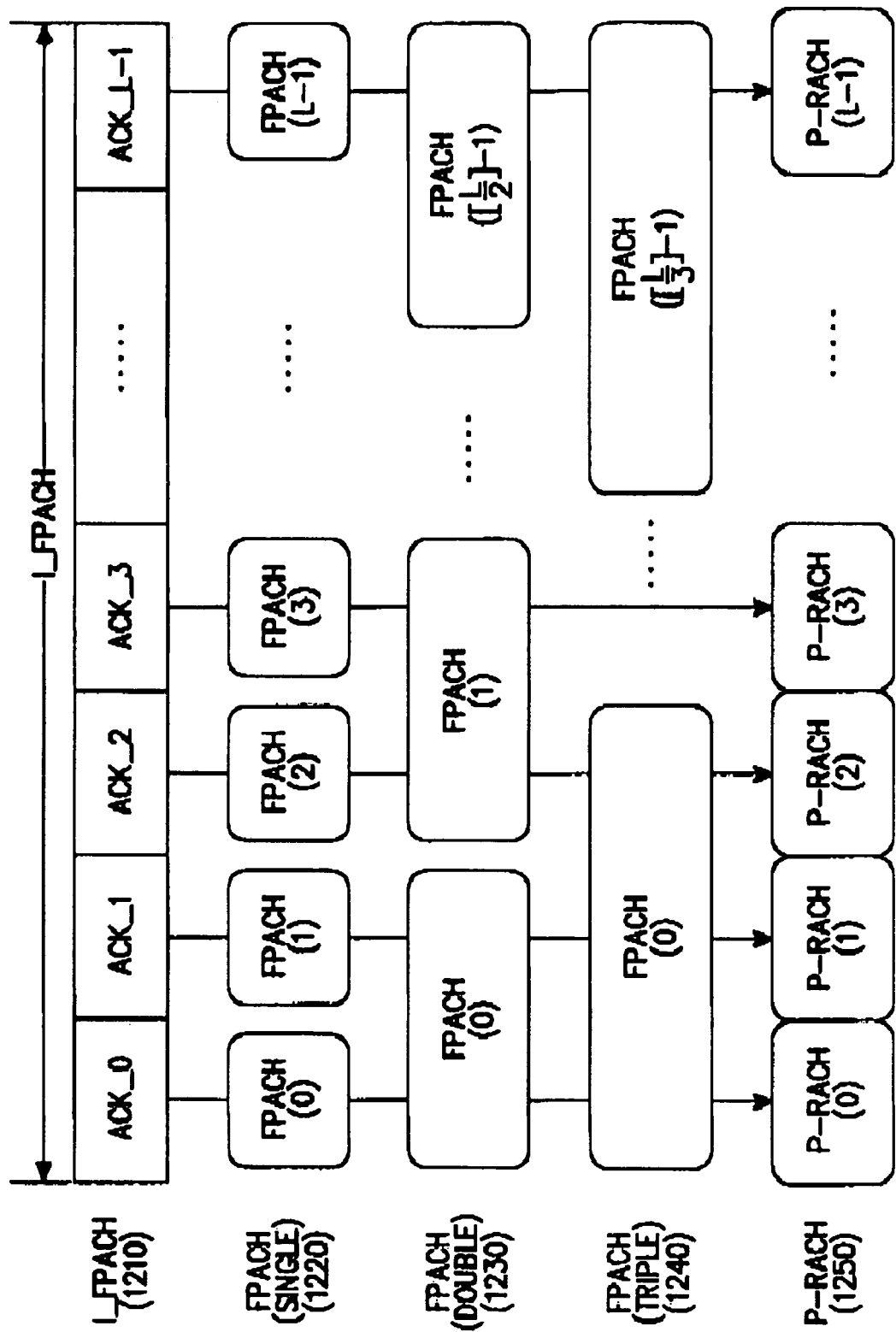
FIG. 12 illustrates the mapping relationship among the I_FPACH, FPACHs, and P-RACHs in the random access procedure according to the third embodiment of the present invention.

FIG. 12 illustrates the relationship between an FPACH to be checked according to the position of an ACK in an I_FPACH signal and a P-RACH corresponding to the FPACH according to the third embodiment of the present invention. Referring to FIG. 12, an I_FPACH 1210 includes ACK areas ACK_0 to ACK_L−1. Here, L is the number of P-RACHs assigned to each sub-frame. If the same ACKs exist in the I_FPACH 1210, they are considered as one ACK. That is, if ACK_0 and ACK_1 occur three times and ACK_2 occurs twice as shown in FIG. 9, it is considered that the I_FPACH 1210 has three ACKs, ACK_0, ACK_1, and ACK_2.

An FPACH (single) 1220 transmits an ACK for one sync codes. In this case, an ACK, an FPACH, and a P-RACH correspond one to one. An FPACH (double) 1230 transmits ACKs for two sync codes at the same time. An FPACH (triple) 1240 transmits ACKs for three sync codes at the same time. The number of FPACHs included in one sub-frame is determined by $$\text{n\_FPACH}(= \text{number of } FPACH) = \left\lceil \frac{L}{2} \right\rceil \quad (9)$$

$$\text{n\_FPACH}(= \text{number of } FPACH) = \left\lceil \frac{L}{3} \right\rceil \quad (10)$$

In Eq. 9 and Eq. 10, L is the number of P-RACHs assigned to each sub-frame and ⌈x⌉ is a maximum integer equal to or less than x.

If the FPACH 1230 is used and L is not a multiple of 2, information about a transmission power variation and a transmission time variation for one UE can be repeated in an $$FPACH\left(\left\lceil \frac{L}{2} \right\rceil - 1\right).$$

If the FPACH 1240 is used and L is not a multiple of 3, a UE whose ACK is in ACK_L−1 can receive double or triple information in an $$FPACH\left(\left\lceil\frac{L}{3}\right\rceil - 1\right).$$

No matter how many times information is repeated in an FPACH signal, a UE transmits data on one P-RACH.

Table 4 below illustrates the mapping relationship among I_FPACH, FPACH, and P-RACH when N=8, M=2, L=2, and H=2.

indexes and sync code arrival time, the UTRAN can discriminately transmit the ACKs for the sync code S2 received in the nth sub-frame (2_S2) and the sync code S2 received in the (n+1)th sub-frame (1_S2). As shown in FIG. 12, the UEs, which selected the sync code S2 in the nth sub-frame and the sync code S2 in the (n+1)th sub-frame, know the mapping relationship between the FPACH and the P-RACH.

The UTRAN receives four sync codes S1, S3, S4, and S6 in the (n+2)th sub-frame. It transmits ACKs for the sync codes S3 and S4 in the (n+3)th sub-frame and ACKs for the sync codes S1 and S6 in the (n+4)th sub-frame on the I_FPACH. The UEs, which transmitted S3 and S4, transmit data on P-RACHs R1 and R2 in an (n+6)th sub-frame, and the UEs,

TABLE 4

| | | Sub-frame number | | | | | | | | |
|---|---|---|---|---|---|---|---|---|---|---|
| | ... | n | n+1 | n+2 | n+3 | n+4 | n+5 | n+6 | n+7 | n+8 | ... |
| Detected sync codes | ... | S1 S2 S3 | S2 S5 | S1 S2 S3 S4 S6 | — | S8 | ... | ... | ... | ... | ... |
| I_FPACH | ... | ... | 1_S1 1_S3 | 2_S2 1_S2 | 1_S3 1_S4 | 2_S1 2_S6 | 1_S8 | ... | ... | ... | ... |
| FPACH (double) | ... | ... | ... | 1_S1 1_S3 | 2_S2 1_S2 | 1_S3 1_S4 | 2_S1 2_S6 | 1_S8 1_S8 | ... | ... | ... |
| P-RACH | ... | ... | ... | ... | ... | R1_1_S1 R2_1_S3 | R1_2_S2 R2_1_S2 | R1_1_S3 R2_1_S4 | R1_2_S1 R2_2_S6 | R1_1_S8 | ... |

Where "detected sync codes" are sync codes S1 to S8 that the UTRAN receives from UEs.

Because two P-RACHs are assigned to each sub-frame, the UTRAN can transmit ACKs for two sync codes by an I_FPACH signal. Each ACK is expressed in the form of n_Sk. n is a positive integer less than M, indicating a relative position in a sub-frame where a sync code is received. In this example, n is 1 or 2. If n is 1, it implies that a sync code was received in the previous sub-frame, and if n is 2, it implies that a sync code was received two sub-frames ago. Sk denotes a received sync code, one of S1 to S8.

In Table 4, an FPACH (double) includes two n_Sks. P-RACHs are expressed as R1_n_Sk and R2_n_Sk. R1 and R2 are used to identify two P-RACHs assigned to one sub-frame.

The UTRAN receives three sync codes S1, S2, and S3 in an nth sub-frame. It selects sync codes S1 and S3 and transmits ACKs for the selected sync codes in an (n+1)th sub-frame on an I_FPACH. When the number of sync codes assigned to each sub-frame is 8, one I_FPACH has 8 ACK areas. According to Eq. 6 and Eq. 7, the ACKs for the sync codes S1 and S3 each occur four times. The UTRAN transmits ACKs for the sync codes S1 and S3 in an (n+2)th sub-frame on an FPACH. The FPACH includes the information shown in Table 3. In an (n+4)th sub-frame, the UEs, which transmitted the sync codes S1 and S3, transmit RACH data on the first P-RACH (R1) and the second P-RACH (R2), respectively.

The UTRAN receives two sync codes S2 and S5 in the (n+1)th sub-frame. It selects a sync code S2 received in the nth sub-frame and not acknowledged, and a sync code S2 received in the (n+1)th sub-frame, and transmits ACKs for the selected sync codes S2 in the (n+2)th sub-frame on the I_FPACH. Referring to Table 2, ACKs for a sync code S2 received in the nth sub-frame and for a sync code S2 received in the (n=1)th sub-frame are transmitted on the I_FPACH in the (n+2)th sub-frame. As shown in FIG. 6, since the ACK areas of the I_FPACH has information about sync code which transmitted S1 and S6, transmit data on P-RACHs R1 and R2 in an (n+7)th sub-frame.

The UTRAN transmits an ACK for a sync code S8 received in the (n+4)th sub-frame in the (n+5)th sub-frame, and a corresponding UE transmits RACH data on the first P-RACH in an (n+8)th sub-frame.

A UE, which transmits a sync code S5 in the (n+1)th sub-frame, fails to acquire a P-RACH. In this case, since the maximum number of waiting sub-frames is 4, the UE performs the random access procedure again after four sub-frames and a predetermined delay time. This case occurs when traffic is concentrated. If the overall traffic is not heavy but traffic is concentrated for a predetermined time, M is increased to thereby assign P-RACHs to all UEs that transmit sync codes.

In accordance with the present invention as described above, resources needed for random access, UpPTS, FPACH, and P-RACH are efficiently used and thus a collision probability is reduced. In addition, since the time required to access an RACH is minimized, performance is increased. The resulting efficient use of the common channel RACH enables users to receive high quality services.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of being approved data transmission from a UTRAN (UMTS Terrestrial Radio Access Network) in a TDD (Time Division Duplexing) CDMA (Code Division Multiple Access) mobile telecommunication system where a frame has a plurality of sub-frames, each sub-frame has a plurality of time slots, and each time slot has a plurality of channels identified by codes, the method comprising the steps of:

selecting one of a plurality of sync codes;

transmitting information about the selected sync code in a time slot of a sub-frame to the UTRAN;

receiving the sync code information, information about an arrival time of the sync code, time update information indicating a variation in a transmission time of data, and power control information indicating an adjustment to a power gain in a UE (User Equipment) from the UTRAN on an FPACH (Fast Physical Access Channel); and transmitting RACH data on a P-RACH (Physical Random Access Channel) mapped from the FPACH according to the time update information and the power control information, the sync code information is received by monitoring as many sub-frames as a quotient of a number of the plurality of sync codes divided by a number of FPACHs per sub-frame, for the FPACH, after transmission of the sync code.

2. The method of claim 1, wherein if the sync code information indicates the selected sync code, the UE receives the sync code information and the sync code arrival time information on the FPACH.

3. A method of approving data transmission to a UE (User Equipment) at a UTRAN (UMTS Terrestrial Radio Access Network) in a TDD (Time Division Duplexing) CDMA (Code Division Multiple Access) mobile telecommunication system where a frame has a plurality of sub-frames, each sub-frame has a plurality of time slots, and each time slot has a plurality of channels identified by codes, the method comprising the steps of:

receiving a plurality of sync codes by which the UTRAN identifies UEs that request data transmission in the time slots of sub-frames;

detecting a reception time delay from an arrival time of each sub-frame including a sync code and a predetermined reception time slot in the sub-frame, measuring a reception power of each sync code, and transmitting information including the sync code, the arrival time of each sub-frame with a sync code, the time delay, and the power measurements on an FAPCH (Fast Physical Access Channel); and receiving data from the UEs on a P-RACH (Physical Random Access Channel) mapped from the FPACH according to the time information and the power control information, wherein the UTRAN transmits the information on FPACHs within as many sub-frames as a quotient of the number of the sync codes divided by the number of FPACHs per sub-frame after receipt of the sync codes.

4. A method of being approved data transmission from a UTRAN (UMTS Terrestrial Radio Access Network) in a TDD (Time Division Duplexing) CDMA (Code Division Multiple Access) mobile telecommunication system where a frame has a plurality of sub-frames, each sub-frame has a plurality of time slots, and each time slot has a plurality of channels identified by codes, the method comprising the steps of:

selecting one of a plurality of sync codes;

transmitting information about the selected sync code in a time slot of a sub-frame to the UTRAN;

receiving information including the sync code in the time slot, detecting a reception time delay from an arrival time of a sub-frame including the sync code and a predetermined reception time slot in the sub-frame, measuring a transmission power of each sync code, and transmitting information including the sync code, the arrival time of each sub-frame with a sync code, the time delay, and the power measurements to a UE (User Equipment) on an FAPCH (Fast Physical Access Channel) in the UTRAN; and receiving the sync code information, information about the arrival time of the sync code, time update information indicating a variation in the transmission time of data, and power information indicating an adjustment to a power gain in the UE from the UTRAN on an FPACH (Fast Physical Access Channel), and transmitting the data on a P-RACH (Physical Random Access Channel) mapped from the FPACH to the UTRAN according to the time update information and the power information in the UE, wherein the UTRAN transmits the information to the UE on the FPACH within as many sub-frames as a quotient of the number of the sync codes divided by the number of FPACHs per sub-frame after receipt of the sync code.

5. A method of being approved data transmission from a UTRAN (UMTS Terrestrial Radio Access Network) at a UE (User Equipment) within a coverage area of the UTRAN in a TDD (Time Division Duplexing) CDMA (Code Division Multiple Access) mobile telecommunication system where a frame has a plurality of sub-frames, each sub-frame has a plurality of time slots, and each time slot has a plurality of channels identified by codes, the method comprising the steps of:

selecting one of a plurality of sync codes by which the UTRAN identifies UEs that request data transmission and transmitting information about the selected sync code in a time slot of a sub-frame to the UTRAN;

receiving information indicating a sub-frame with an FPACH (East Physical Access Channel) that acknowledges the sent sync code on an _FPACH (Index Fast Physical Access Channel) from the UTRAN, receiving time update information and power control information on the FPACH indicated by the I_FPACH; and transmitting data on a P-RACH (Physical Random Access Channel) mapped from the FPACH according to the time update information and the power information.

6. The method of claim 5, wherein the I_FPACH information includes an index of the sent sync code and the arrival time of the sync code.

7. The method of claim 6, wherein the sub-frame with the FPACH is received one sub-frame after the I_FPACH.

8. The method of claim 6, wherein the length of the sync code index field is calculated by $$l_{Index} = \lceil \log_2 N \rceil$$

where N is the number of sync codes.

9. The method of claim 6, wherein the length of the arrival time field is calculated by $$l_{time} = \lceil \log_2 M \rceil$$

where M is the maximum number of sub-frames to be monitored for the I_FPACH.

10. A method of approving RACH (Random Access Channel) data transmission to a UE (User Equipment) within a coverage area of a UTRAN (UMTS Terrestrial Radio Access Network) at the UTRAN in a TDD (Time Division Duplexing) CDMA (Code Division Multiple Access) mobile telecommunication system where a frame has a plurality of sub-frames, each sub-frame has a plurality of time slots, and each time slot has a plurality of channels identified by codes, the method comprising the steps of:

receiving one of a plurality of sync codes by which the UTRAN identifies UEs that request data transmission in a time slot of a sub-frame;

transmitting information indicating a sub-frame with an FPACH (Fast Physical Access Channel) that acknowledges the received sync code to the UE on an I_FPACH (Index Fast Physical Access Channel);

transmitting time update information and power control information on the FPACH indicated by the I_FPACH; and receiving RACH transmission data from the UE on a P-RACH (Physical Random Access Channel) mapped from the FPACH at a time adjusted according to the time update information and with power controlled according to the power information.

11. The method of claim 10, wherein the UTRAN transmits acknowledgements for a plurality of sync codes on the I_FPACH.

12. The method of claim 11, wherein the I_FPACH transmits acknowledgments for eight sync codes.

13. The method of claim 11, wherein if the number of sync codes that the UTRAN acknowledges is less than the number of P-RACHs, the acknowledgment for a sync code is repeated in the I_FPACH signal.

14. The method of claim 13, wherein acknowledgment repetition times common to the sync codes is determined by $$R_1 = \left\lfloor \frac{N}{A} \right\rfloor$$

and the number of acknowledgements to be repeated one more time is calculated by $$R_2 = \left\{ \frac{N}{A} - \left\lfloor \frac{N}{A} \right\rfloor \right\} \times A$$

where N is the number of sync codes and A is the number of sync codes acknowledged in one sub-frame.

15. The method of claim 10, wherein if two sync codes are acknowledged on one FPACH, the number of FPACHs included in one sub-frame is calculated by $$\text{n\_FPACH}(= \text{number of } FPACH) = \left\lceil \frac{L}{2} \right\rceil$$

where L is the number of P-RACHs assigned to one sub-frame and $\lceil x \rceil$ is a maximum integer equal to or less than x.

16. The method of claim 10, wherein if three sync codes are acknowledged on one FPACH, the number of FPACHs included in one sub-frame is calculated by $$\text{n\_FPACH}(= \text{number of } FPACH) = \left\lceil \frac{L}{3} \right\rceil$$

where L is the number of P-RACHs assigned to one sub-frame and $\lceil x \rceil$ is a maximum integer equal to or less than x.

17. A method of approving RACH (Random Access Channel) data transmission in a TDD (Time Division Duplexing) CDMA (Code Division Multiple Access) mobile telecommunication system where a frame has a plurality of sub-frames, each sub-frame has a plurality of time slots, and each time slot has a plurality of channels identified by codes, the method comprising the steps of:

selecting one of a plurality of sync codes by which a UTRAN (UMTS Terrestrial Radio Access network) identifies UEs (User Equipments) that request data transmission and transmitting the selected sync code in a time slot of a sub-frame by a UE;

receiving information including the sync code from the UE, transmitting information indicating a sub-frame with an FPACH (Fast Physical Access Channel) that acknowledges the sync code to the UE on an I_FPACH (Index Fast Physical Access Channel), and transmitting an acknowledgment including time update information and power control information to the UE on the FPACH by the UTRAN; and receiving the I_FPACH frame and the FPACH frame from the UTRAN and transmitting RACH data on the P-RACH to the UTRAN according to the time update information and the power control information by the UE.

* * * * *